United States Patent
Jang et al.

(10) Patent No.: US 7,209,372 B2
(45) Date of Patent: Apr. 24, 2007

(54) FLYBACK CONVERTER WITH SYNCHRONOUS RECTIFIER

(75) Inventors: Chan Gyu Jang, Kyungki-do (KR); Tae Young Ahn, Choongchungbook-do (KR); Young Joo Kim, Kyungki-do (KR); Sung Cheol Kim, Kyungki-do (KR); Tae Ook Park, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 302 days.

(21) Appl. No.: 11/019,418

(22) Filed: Dec. 23, 2004

(65) Prior Publication Data

US 2006/0087868 A1 Apr. 27, 2006

(30) Foreign Application Priority Data

Oct. 22, 2004 (KR) ...................... 10-2004-0084637

(51) Int. Cl.
*H02M 3/335* (2006.01)
(52) U.S. Cl. .................. 363/21.14; 363/21.17
(58) Field of Classification Search ............. 363/21.12, 363/21.14, 21.17, 89, 97
See application file for complete search history.

(56) References Cited

U.S. PATENT DOCUMENTS

| | | | |
|---|---|---|---|
| 4,945,465 A * | 7/1990 | Marinus et al. ................ | 363/59 |
| 6,191,965 B1 * | 2/2001 | Matsumoto ................... | 363/89 |
| 6,353,544 B1 | 3/2002 | Lau .......................... | 363/21.14 |
| 6,462,965 B1 * | 10/2002 | Uesono ..................... | 363/21.14 |
| 6,594,161 B2 * | 7/2003 | Jansen et al. ............. | 363/21.14 |
| 6,813,166 B1 * | 11/2004 | Chang et al. ............. | 363/21.14 |
| 7,012,821 B1 * | 3/2006 | Park et al. ................ | 363/21.12 |
| 7,123,489 B2 * | 10/2006 | Park et al. ................ | 363/21.14 |

* cited by examiner

*Primary Examiner*—Jeffrey Sterrett
(74) *Attorney, Agent, or Firm*—Lowe Hauptman & Berner, LLP.

(57) ABSTRACT

Disclosed herein is a flyback converter with a synchronous rectifier which is applied to a power supply of a portable computer such as a notebook PC. The flyback converter is operated in a critical conduction mode to turn on/off a main switch at a zero crossing point of an output voltage. The flyback converter is also adapted to supply a driving voltage to a synchronous switch using the output voltage. Therefore, there is no need for a secondary auxiliary coil of a transformer and for a Schottky diode to be connected in parallel with the synchronous switch, resulting in simplification in circuit design.

8 Claims, 8 Drawing Sheets

FLYBACK CONVERTER WITH SYNCHRONOUS RECTIFIER

RELATED APPLICATIONS

The present application is based on, and claims priority from, Korean Application Number 2004-84637, filed Oct. 22, 2004, the disclosure of which is incorporated by reference herein in its entirety.

BACKGROUND OF THE INVENTION

1. Field of the Invention

The present invention relates to a flyback converter which is applied to a power supply of a portable computer such as a notebook PC, and more particularly to a flyback converter with a synchronous rectifier which is operated in a critical conduction mode to turn on/off a main switch at a zero crossing point of an output voltage and is adapted to supply a driving voltage to a synchronous switch using the output voltage, resulting in no need for a secondary auxiliary coil of a transformer and for a Schottky diode to be connected in parallel with the synchronous switch and, thus, simplification in circuit design.

2. Description of the Related Art

Recently, electronic and electric appliances have had an increasing number of functions desired by customers, have been increasingly digitized to perform such multiple functions, and have keenly required a small-size, high-efficiency power supply to provide services appropriate to the customers' various desires.

Among existing power supplies, a flyback power supply is most widely used owing to the advantage of having a smaller number of components enabling lower-cost production and miniaturization.

However, recently, electronic and electric appliances have required a lower-voltage, larger-current power supply, so that a diode rectifier system for an existing flyback converter cannot meet smallness, thinness and high-efficiency conditions desired by the customers any longer. Furthermore, since loss occurs in proportion to output current, the diode rectifier system may suffer excessive loss if the output current is large.

In this connection, a synchronous rectifier system using a semiconductor switch with small conduction loss, such as a MOS (Metal-Oxide Semiconductor) transistor, has been proposed to replace the diode rectifier system.

Figure 1:
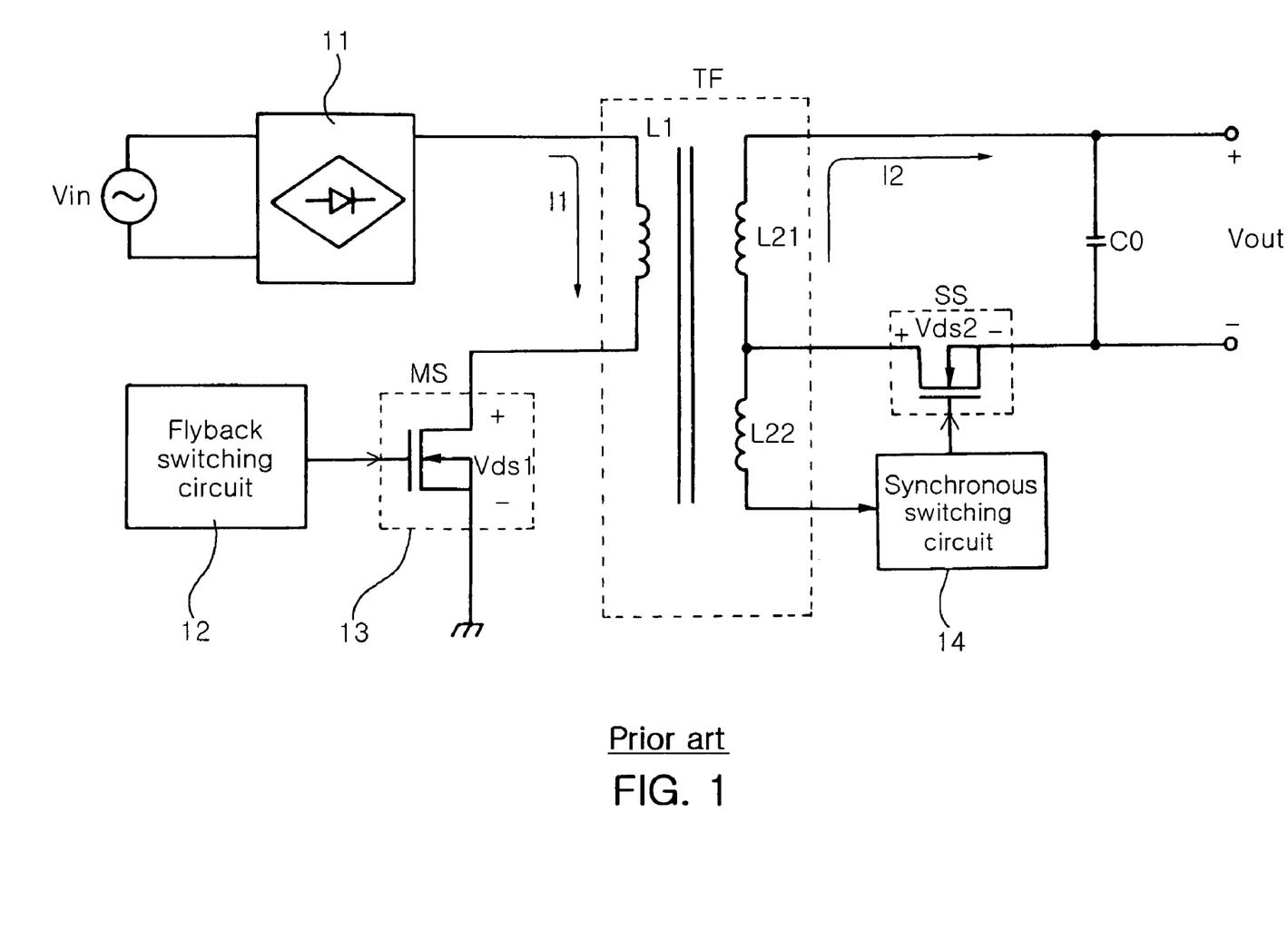
FIG. 1 is a circuit diagram illustrating the concept of a general flyback converter.
Figure 2:
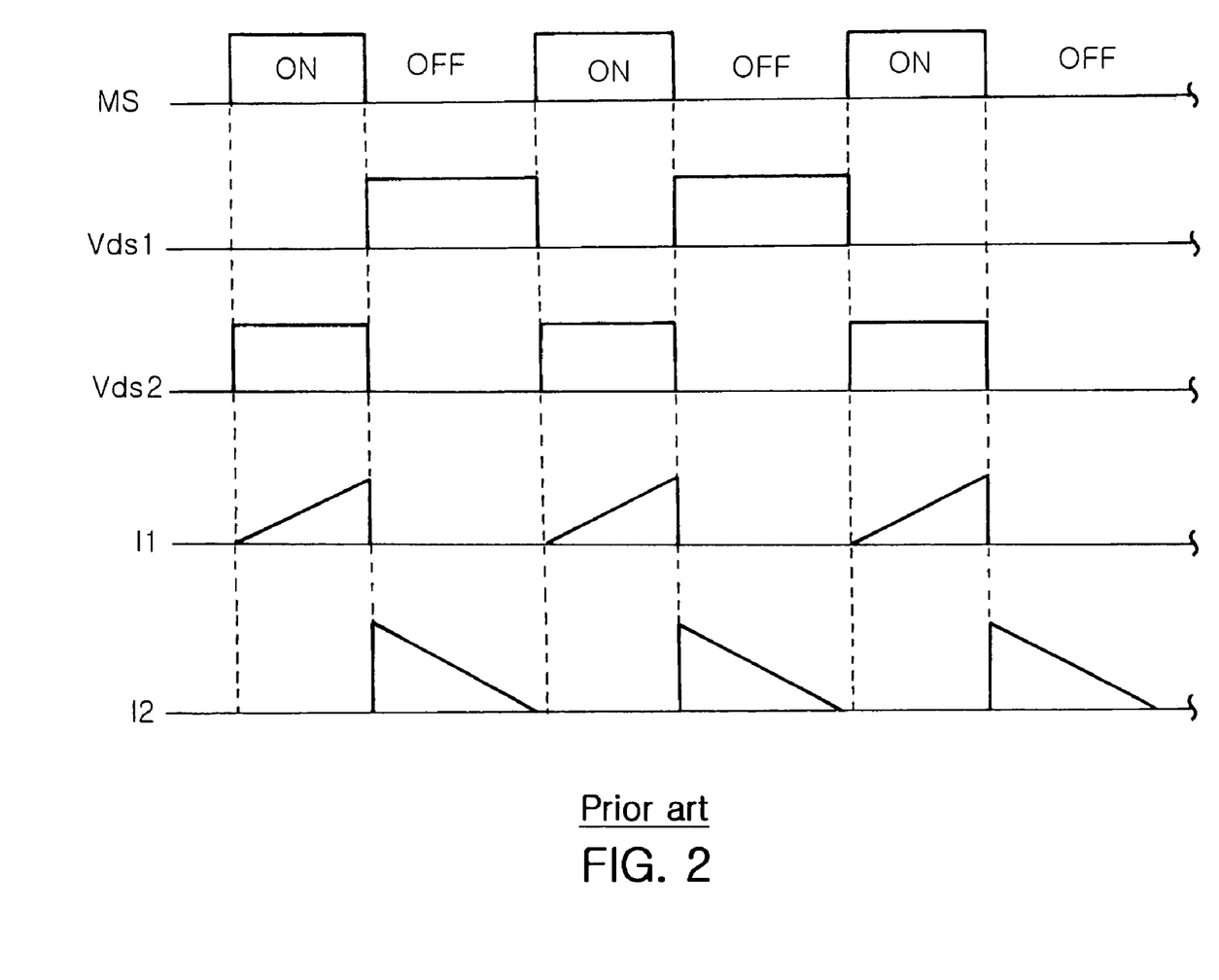
FIG. 2 is a timing diagram of main signals in FIG. 1.

FIG. 1 is a circuit diagram illustrating the concept of a general flyback converter, and FIG. 2 is a timing diagram of main signals in FIG. 1.

In FIGS. 1 and 2, an alternating current (AC) input voltage Vin is rectified by a rectifier 11 and then provided to a transformer TF. At this time, a flyback switching circuit 12 switches a main switch MS, so that the main switch MS is turned on/off repeatedly as shown in FIG. 2.

A drain-source voltage Vds1 of the main switch MS varies with the on/off operation of the main switch MS, as shown in FIG. 2.

That is, if the main switch MS is turned on, primary current I1 flows in a primary coil L1 of the transformer TF through the main switch MS, as shown in FIG. 2, and, at the same time, a synchronous switch SS is turned off by a synchronous switching circuit 14. At the time that the main switch MS is turned off, the synchronous switch SS is turned on by the synchronous switching circuit 14, so that energy in the primary coil L1 of the transformer TF is induced to a secondary main coil L21 of the transformer TF, thereby causing secondary current I2 to flow as shown in FIG. 2.

Here, Vds1 is a voltage applied across the main switch MS, and Vds2 is a voltage applied across the synchronous switch SS.

The drain-source voltage Vds2 of the synchronous switch SS varies with the on/off operation of the synchronous switch SS, as shown in FIG. 2. Here, the synchronous switching circuit 14 is supplied with a driving voltage from a secondary auxiliary coil L22 of the transformer TF connected to the secondary main coil L21 thereof.

Through this process, a voltage in the secondary main coil L21 of the transformer TF is supplied as an output voltage Vout via an output capacitor Co.

As can be seen from the above description, the synchronous switching circuit 14 for the synchronous switch SS is turned on/off synchronously with the flyback switching circuit 12, so the synchronous switch SS, which is a MOS transistor, acts as a rectifier.

This flyback converter can be classified into various types according to technical details, such as driving methods for the main switch and synchronous switch and the design of a driving circuit for the synchronous switch, and one example of flyback converters of such various types will hereinafter be described with reference to FIGS. 3 and 4.

Figure 3:
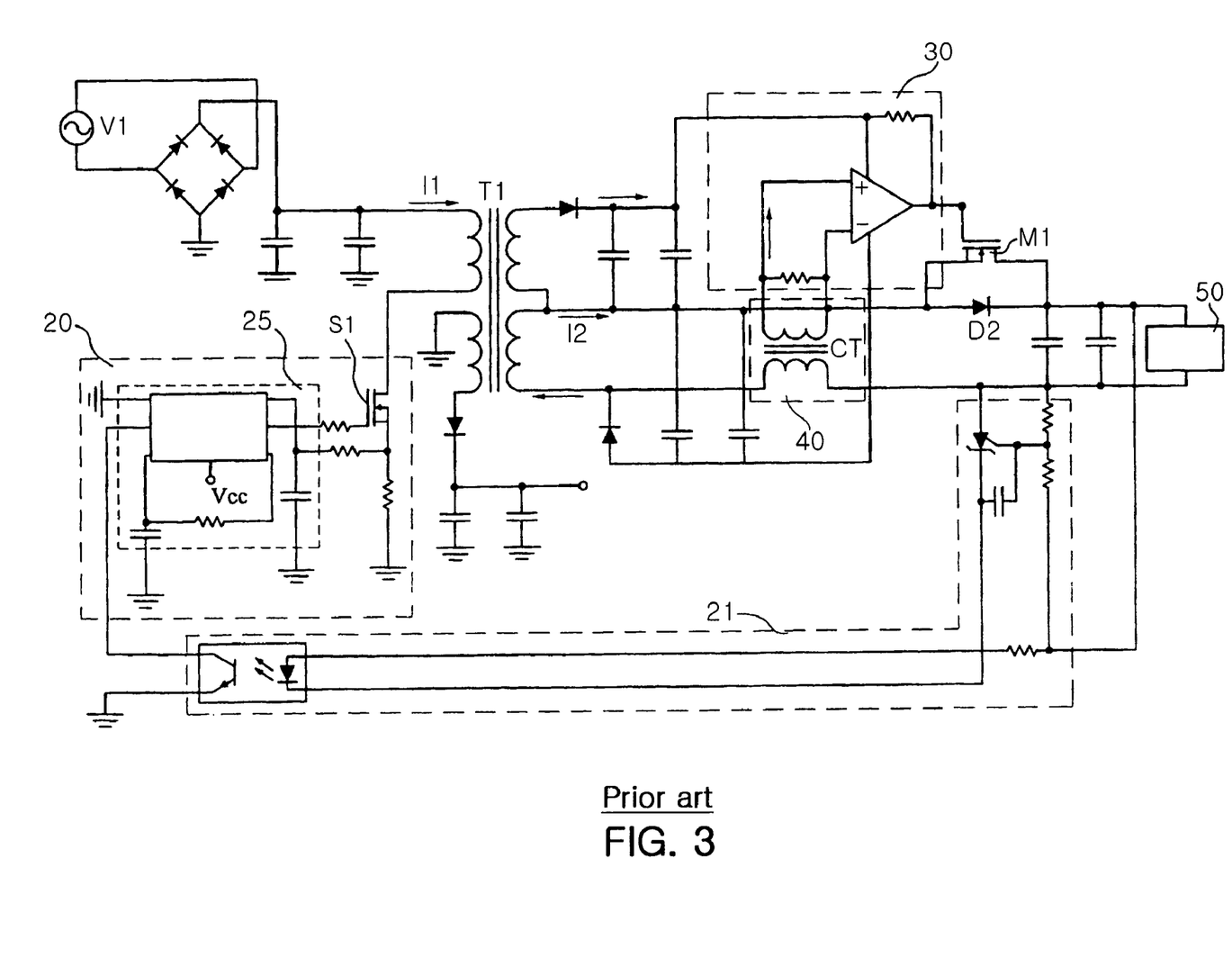
FIG. 3 is a circuit diagram of a conventional flyback converter.

FIG. 3 is a circuit diagram of a conventional flyback converter.

With reference to FIG. 3, the conventional flyback converter comprises a voltage source, a flyback switching circuit 20 for receiving a voltage from the voltage source and outputting a high-frequency pulse to a switch S1, a transformer T1 having a primary coil connected to the flyback switching circuit 20 for receiving the high-frequency pulse therefrom, and two secondary coils acting as a master source and a sub-source, respectively, a synchronous rectifier 30 connected to a current sensor 40 and the sub-source for outputting a driving pulse, and a synchronous switch M1 connected in parallel with an output diode D2 for receiving the driving pulse from the synchronous rectifier 30. The output diode D2 has one end connected to the master source and the other end connected to a load 50, which is in turn connected in parallel with an output capacitor. The current sensor 40 is connected in series to the load 50 to detect load current. The current sensor 40 also acts to transfer the detected load current to the synchronous rectifier 30. Here, V1 denotes a power source, 21 denotes a feedback circuit, and 25 denotes a gate control circuit.

Details of the flyback converter of FIG. 3 are disclosed in U.S. Pat. No. 6,353,544.

Figure 4A:
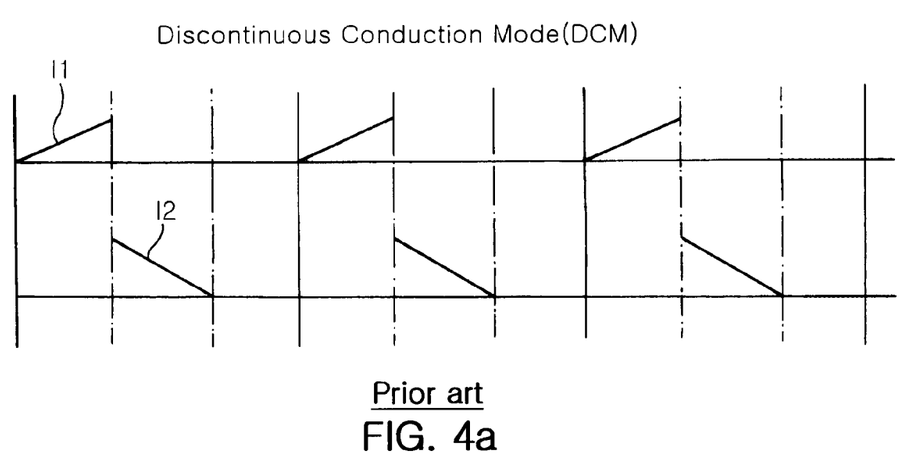
FIGS. 4a and 4b are waveform diagrams of currents in respective operation modes of the flyback converter of FIG. 3.
Figure 4B:
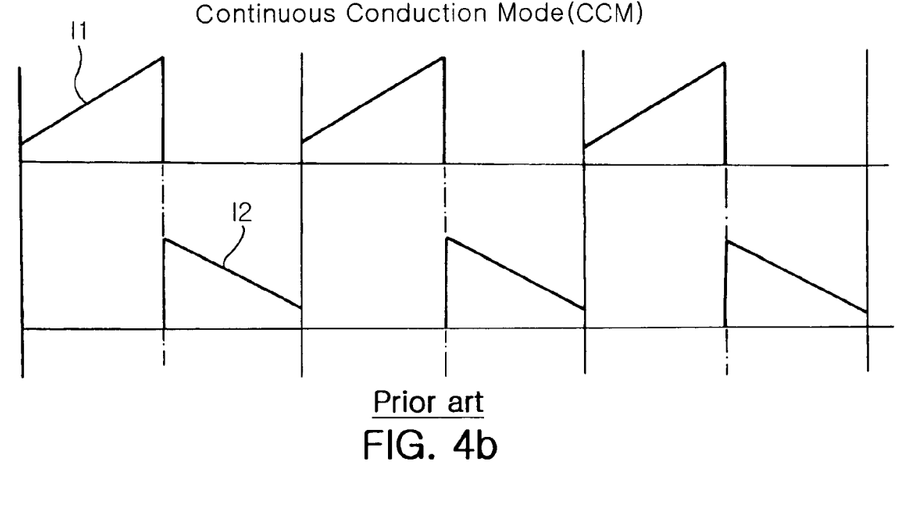

FIGS. 4a and 4b are waveform diagrams of currents in respective operation modes of the flyback converter of FIG. 3.

With reference to FIGS. 3 to 4b, in the conventional flyback converter, the switch S1 is operated at a fixed frequency, so that it is appropriate to both a discontinuous conduction mode (DCM) of FIG. 4a and a continuous conduction mode (CCM) of FIG. 4b.

Figure 5:
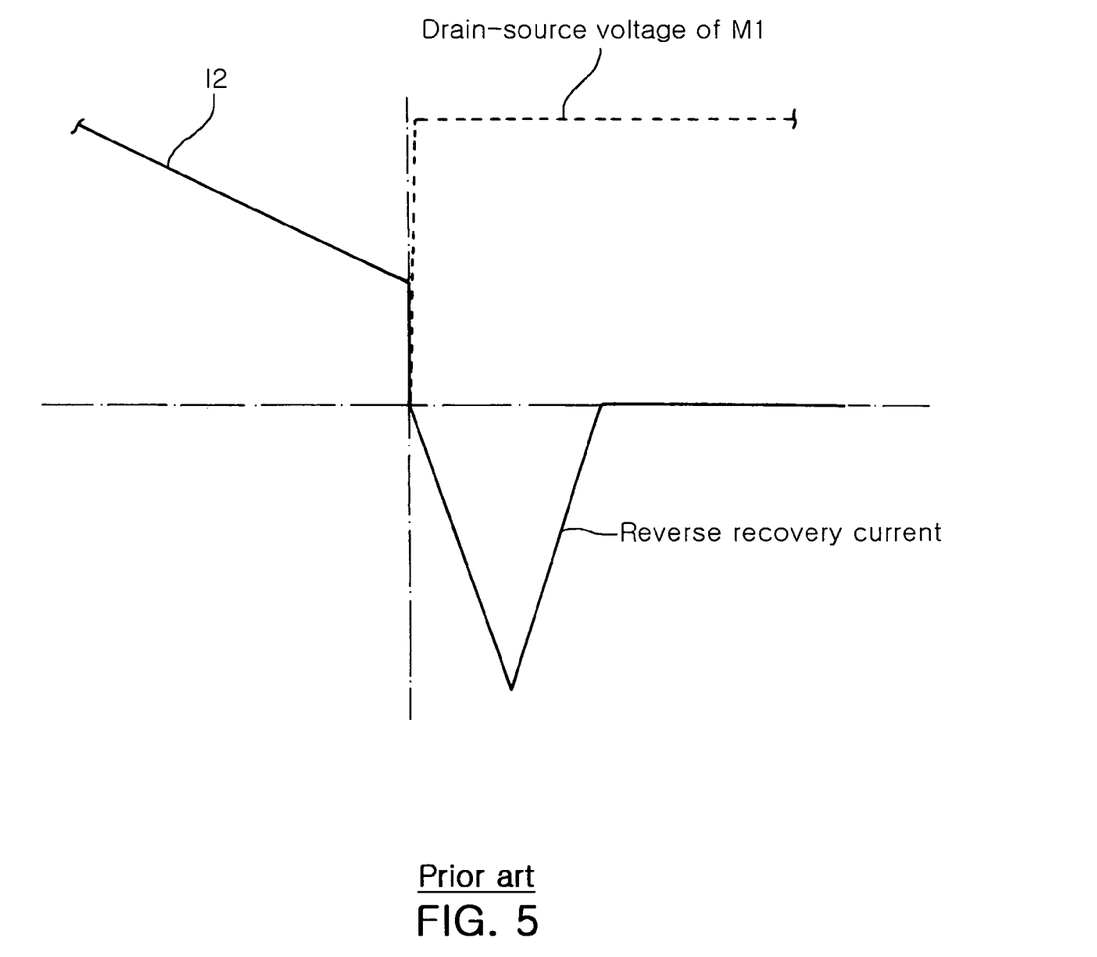
FIG. 5 is a waveform diagram of reverse recovery current in the flyback converter of FIG. 3.

FIG. 5 is a waveform diagram of reverse recovery current in the flyback converter of FIG. 3.

In the conventional flyback converter of FIG. 3, in the CCM, which is a main operation mode of the flyback converter, while a large amount of secondary current I2 flows, the synchronous switch M1 is turned off at the moment that the switch S1 is turned on. In this case, reverse recovery current (RRC) may be instantaneously generated due to PN junction characteristics of the synchronous switch M1. In order to prevent such RRC from being generated, the output diode D2, which is a Schottky diode, is connected in parallel with the synchronous switch M1. That is, the generation of RRC is prevented by a Schottky diode with little reverse recovery time.

However, the above-mentioned conventional flyback converter is disadvantageous in that the synchronous switch driving circuit is complicated because the secondary auxiliary coil is necessary for supply of a driving voltage to the synchronous switch and the flyback converter is operated in both the DCM and CCM. Moreover, in order to prevent the generation of RRC, the Schottky diode must be connected in parallel with the synchronous switch, causing reduction in available area of a printed circuit board (PCB) and, in turn, increase in production cost.

SUMMARY OF THE INVENTION

Therefore, the present invention has been made in view of the above problems, and it is an object of the present invention to provide a flyback converter with a synchronous rectifier which is operated in a critical conduction mode to turn on/off a main switch at a zero crossing point of an output voltage and is adapted to supply a driving voltage to a synchronous switch using the output voltage, resulting in no need for a secondary auxiliary coil of a transformer and for a Schottky diode to be connected in parallel with the synchronous switch and, thus, simplification in circuit design.

In accordance with the present invention, the above and other objects can be accomplished by the provision of a flyback converter with a synchronous rectifier, comprising: a flyback switching controller for switching a main switch in a critical conduction mode on the basis of a feedback voltage to convert an input voltage into a high-frequency pulse; a transformer having a primary coil for receiving the high-frequency pulse and a secondary coil; a synchronous switch including a MOSFET having a source and drain connected to any one of first and second output lines connected respectively to both ends of the secondary coil; a feedback controller for detecting an output voltage between the first output line and the second output line and outputting the detected voltage as the feedback voltage to the flyback switching controller; a current detector having primary and secondary coils for current detection, the current detector detecting load current flowing in any one of the first and second output lines according to a turn ratio between the primary and secondary current detection coils thereof; a current/voltage converter for converting the load current detected by the current detector into a voltage and outputting the converted voltage; a first switch connected to the first output line through a first resistor and to the second output line for performing an on/off switching operation in response to the output voltage from the current/voltage converter; a second switch connected to the first output line through a second resistor and to the second output line for performing an off/on switching operation in a reverse manner to the on/off switching operation of the first switch in response to the on/off switching operation of the first switch; a constant voltage source connected to the first output line through the second resistor and to the second output line for converting a voltage on the first output line into a predetermined constant voltage and supplying the converted constant voltage; a turn-on switch for switching a connection between the first output line and a gate of the synchronous switch in response to the constant voltage from the constant voltage source; and a turn-off switch for switching a connection between the gate and source of the synchronous switch in association with the switching operation of the second switch.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings.

Figure 6:
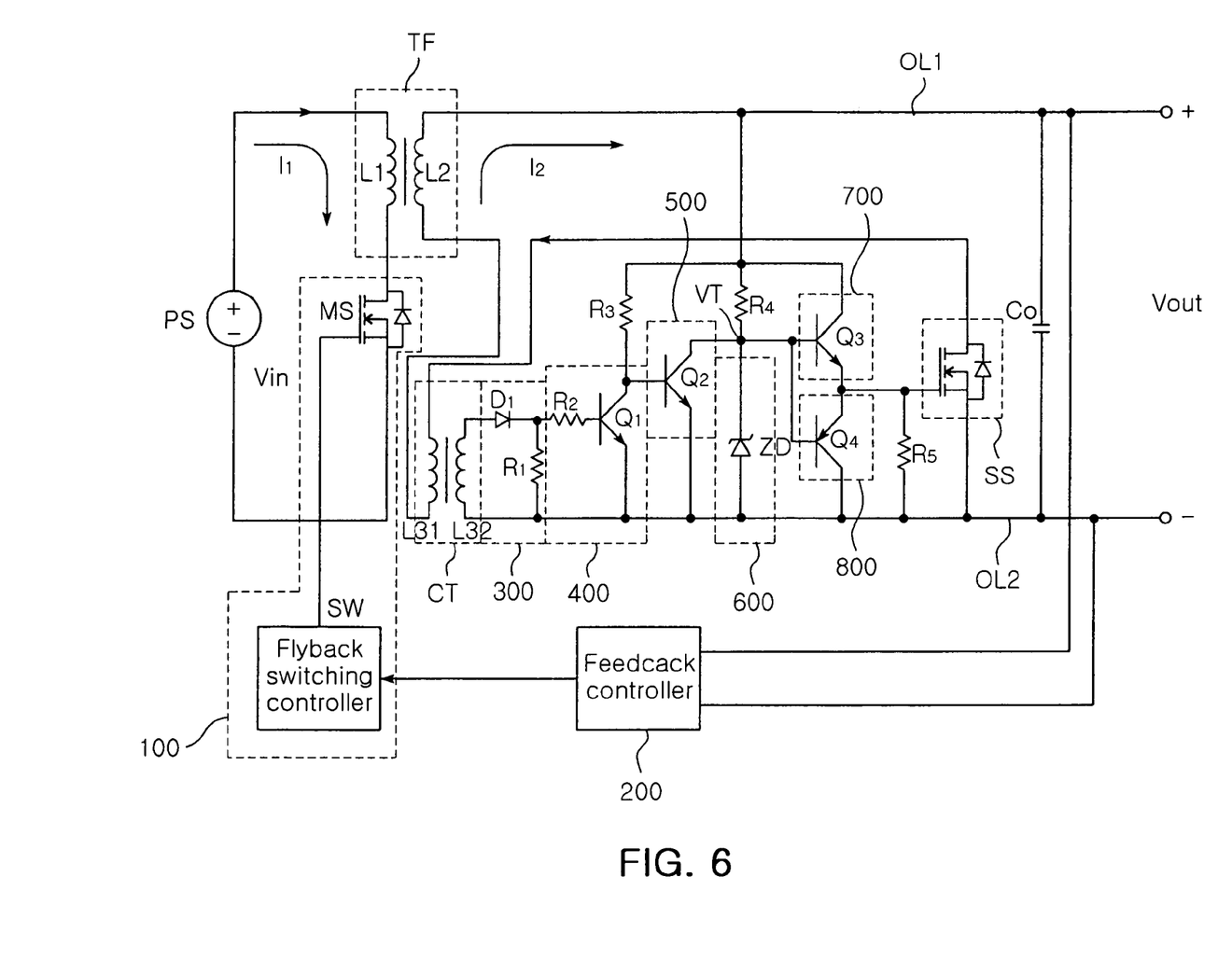
FIG. 6 is a circuit diagram showing the configuration of a flyback converter according to the present invention.

FIG. 6 is a circuit diagram showing the configuration of a flyback converter according to the present invention.

With reference to FIG. 6, the flyback converter according to the present invention comprises a flyback switching controller 100 for switching a main switch MS in a critical conduction mode on the basis of a feedback voltage to convert a voltage Vs into a high-frequency pulse, a transformer TF having a primary coil L1 for receiving the high-frequency pulse and a secondary coil L2, a feedback controller 200 for detecting an output voltage between first and second output lines OL1 and OL2 connected respectively to both ends of the secondary coil L2 and outputting the detected voltage as the feedback voltage to the flyback switching controller 100, a synchronous switch SS composed of a MOSFET having a source and drain connected to the second output line OL2, and a current detector CT having primary and secondary coils L31 and L32 for current detection. The current detector CT acts to detect load current flowing in the second output line OL2 according to a turn ratio between the primary and secondary current detection coils L31 and L32 thereof. The flyback converter further comprises a current/voltage converter 300 for converting the load current detected by the current detector CT into a voltage and outputting the converted voltage, a first switch 400 connected to the first output line OL1 through a resistor R3 and to the second output line OL2 for performing an on/off switching operation in response to the output voltage from the current/voltage converter 300, and a second switch 500 connected to the first output line OL1 through a resistor R4 and to the second output line OL2 for performing the reverse of the on/off switching operation of the first switch 400, namely, an off/on switching operation, in response to the on/off switching operation of the first switch 400. The flyback converter further comprises a constant voltage source 600 connected to the first output line OL1 through the resistor R4 and to the second output line OL2 for converting a voltage on the first output line OL1 into a predetermined constant voltage and supplying the converted constant voltage, a turn-on switch 700 for switching a connection between the first output line OL1 and a gate of the synchronous switch SS in response to the constant voltage from the constant voltage source 600, and a turn-off switch 800 for switching a connection between the gate and source of the synchronous switch SS in association with the switching operation of the second switch 500.

Preferably, the turn ratio between the primary and secondary current detection coils L31 and L32 of the current detector CT is set to turn on the turn-off switch 800 at a predetermined time TD before the main switch MS is turned on.

The current/voltage converter 300 includes a diode D1 having an anode connected to a positive voltage terminal of the secondary coil L32 of the current detector CT, and a resistor R1 for voltage detection connected between a cathode of the diode D1 and a negative voltage terminal of the secondary coil L32 of the current detector CT.

The first switch 400 is composed of a first transistor Q1 of an NPN type having a collector connected to the first output line OL1 through the resistor R3, an emitter connected to the second output line OL2 and a base connected to an output terminal of the current/voltage converter 300 through a resistor R2.

The second switch 500 is composed of a second transistor Q2 of the NPN type having a collector connected to the first output line OL1 through the resistor R4, an emitter connected to the second output line OL2 and a base connected to the collector of the first transistor Q1 of the first switch 400.

The constant voltage source 600 is composed of a Zener diode ZD having a cathode connected to the first output line OL1 through the resistor R4 and an anode connected to the second output line OL2.

The turn-on switch 700 is composed of a third transistor Q3 of the NPN type having a collector connected to the first output line OL1, an emitter connected to the gate of the synchronous switch SS and a base connected to the cathode of the Zener diode ZD of the constant voltage source 600.

The turn-off switch 800 is composed of a fourth transistor Q4 of a PNP type having an emitter connected to the gate of the synchronous switch SS, a collector connected to the source of the synchronous switch SS and a base connected to the cathode of the Zener diode ZD of the constant voltage source 600.

Here, the reference character Co, not described, denotes an output capacitor.

Figure 7:
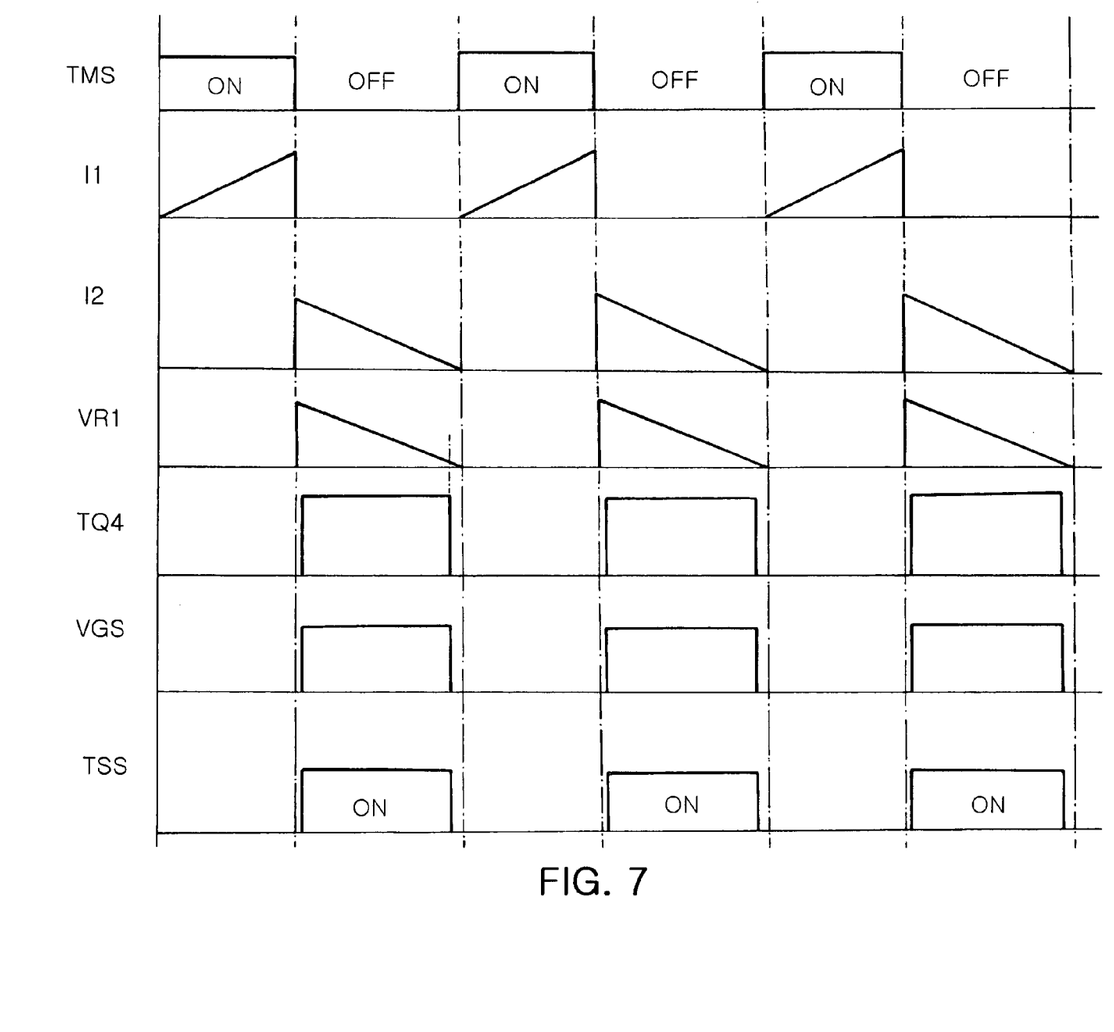
FIG. 7 is a timing diagram of main signals in the flyback converter according to the present invention.

FIG. 7 is a timing diagram of main signals in the flyback converter according to the present invention.

In FIG. 7, TMS represents an on/off timing of the main switch MS, I1 represents primary current of the transformer TF, I2 represents secondary current of the transformer TF, VR1 represents a voltage detected by the voltage detection resistor R1, TQ4 represents an on/off timing of the fourth transistor Q4 of the turn-off switch 800, VGS represents a gate-source voltage of the synchronous switch SS, and TSS represents an on/off timing of the synchronous switch SS.

Figure 8:
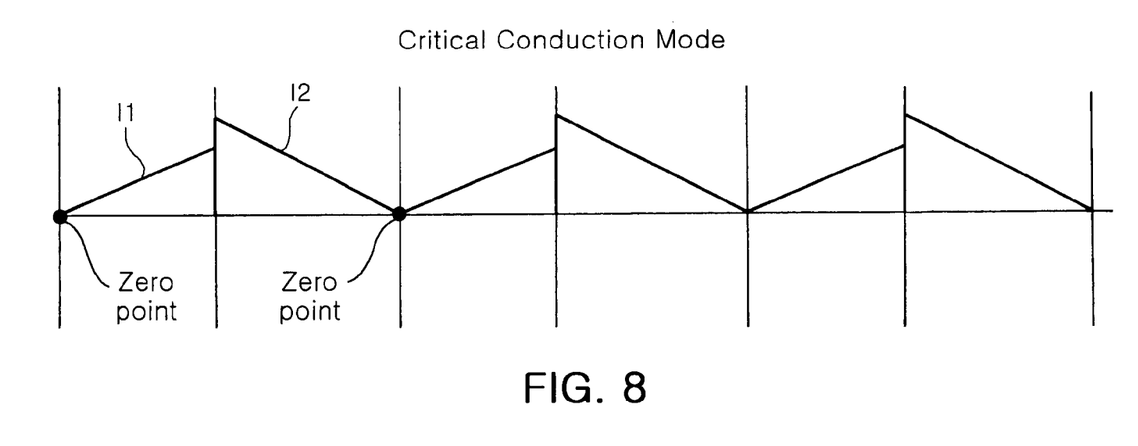
FIG. 8 is a waveform diagram of currents in the flyback converter according to the present invention.

FIG. 8 is a waveform diagram of currents in the flyback converter according to the present invention.

In FIG. 8, I1 represents the primary current of the transformer TF and I2 represents the secondary current of the transformer TF. As can be seen from this drawing, the synchronous rectifier driving circuit is operated in a critical conduction mode where the primary current I1 begins to flow at a zero point and the flow of the secondary current I2 is terminated at another zero point.

Figure 9:
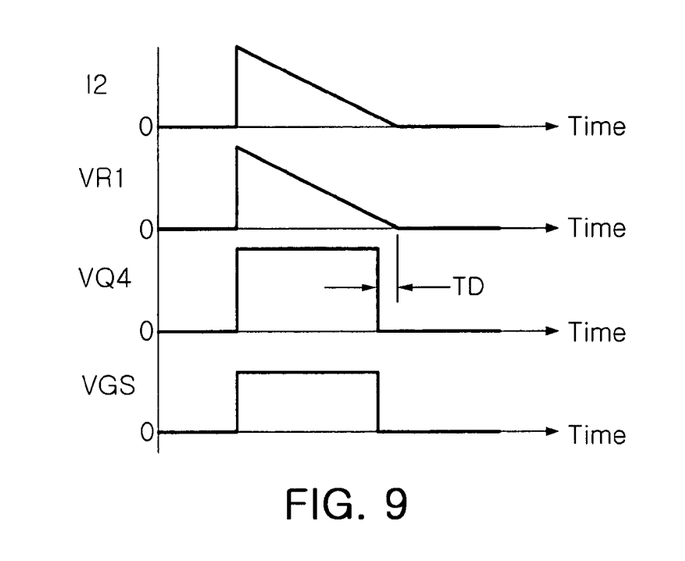
FIG. 9 is a timing diagram illustrating the operation of a synchronous switch in the flyback converter according to the present invention.

FIG. 9 is a timing diagram illustrating the operation of the synchronous switch SS in the flyback converter according to the present invention.

In FIG. 9, I2 represents the secondary current of the transformer TF, VR1 represents the voltage detected by the voltage detection resistor R1, TQ4 represents the on/off timing of the fourth transistor Q4 of the turn-off switch 800, and VGS represents the gate-source voltage of the synchronous switch SS.

Next, a detailed description will be given of the operation of the flyback converter with the above-stated configuration according to the present invention in conjunction with the annexed drawings.

With reference to FIGS. 6 to 9, in the flyback converter according to the present invention, the flyback switching controller 100 switches the main switch MS in the critical conduction mode on the basis of a feedback voltage to convert the voltage Vs into a high-frequency pulse. This high-frequency pulse is induced from the primary coil L1 of the transformer TF to the secondary coil L2 thereof.

At this time, the feedback controller 200 detects an output voltage between the first output line OL1 and the second output line OL2 connected respectively to both ends of the secondary coil L2, and outputs the detected voltage as the feedback voltage to the flyback switching controller 100.

As shown in FIG. 7, in the flyback converter of the present invention, the primary current I1 flows in the primary coil L1 of the transformer TF when the main switch MS is turned on in response to a switching signal SW, and the secondary current I2 flows in the secondary coil L2 of the transformer TF when the main switch MS is turned off in response to the switching signal SW.

This operation of the flyback converter is performed in the critical conduction mode. That is, in the critical conduction mode applied to the flyback converter of the present invention, the primary current I1 begins to flow at a zero point and the flow of the secondary current I2 is terminated at another zero point, as shown in FIG. 8, by means of the flyback switching controller 100 and feedback controller 200.

Meanwhile, the synchronous switch SS can be connected to any one of the first output line OL1 or second output line OL2 of the transformer TF. In an embodiment of the present invention, as shown in FIG. 6, the synchronous switch SS is implemented with a MOS transistor connected to the second output line OL2.

Referring again to FIG. 6, if the secondary current I2 flows, the current detector CT detects load current flowing in the second output line OL2, of the first and second output lines OL1 and OL2, according to the turn ratio between the primary and secondary current detection coils L31 and L32 thereof and provides the detected load current to the current/voltage converter 300.

The current/voltage converter 300 converts the load current detected by the current detector CT into a voltage and outputs the converted voltage. In detail, in the current/voltage converter 300, the diode D1 rectifies current in the secondary coil L32 of the current detector CT, and the resistor R1 detects a voltage corresponding to the rectified current.

Then, the first switch 400 switches on/off the connection between the first output line OL1 and the second output line OL2 through the resistor R3 in response to the output voltage from the current/voltage converter 300. The second switch 500 switches off/on the connection between the first output line OL1 and the second output line OL2 through the resistor R4 in a reverse manner to the on/off switching operation of the first switch 400 in response to the on/off switching operation thereof.

For example, when the current detector CT detects the secondary current I2, the current/voltage converter 300 outputs a predetermined voltage, for example, a voltage higher than or equal to a turn-on voltage of the first switch 400.

At this time, the first transistor Q1 of the first switch 400 is turned on and the voltage level of the collector thereof thus becomes a ground level, thereby causing the second transistor Q2 of the second switch 500, the base of which is connected to the collector of the first transistor Q1, to be turned off.

Thereafter, the constant voltage source 600 converts a voltage on the first output line OL1 into a predetermined constant voltage and supplies the converted constant voltage, thereby causing the turn-on switch 700 to be turned on, resulting in the connection between the first output line OL1 and the gate of the synchronous switch SS. As a result, the voltage on the first output line OL1 is supplied to the gate of the synchronous switch SS, so as to turn on the synchronous switch SS.

In this manner, when the secondary current I2 begins to flow, the synchronous switch SS is turned on, so the secondary current I2 flows through the synchronous switch SS, which is composed of a MOSFET with little loss.

On the other hand, when the current detector CT detects no secondary current I2, the current/voltage converter 300 outputs a predetermined voltage, for example, a voltage lower than the turn-on voltage of the first switch 400, namely, a voltage close to zero.

At this time, the first transistor Q1 of the first switch 400 is turned off, and the output voltage from the current/voltage converter 300 is supplied to the second transistor Q2 of the second switch 500 through the resistor R3, so as to turn on the second transistor Q2.

If the second transistor Q2 of the second switch 500 is turned on, a constant voltage supply terminal VT of the constant voltage source 600 is connected to the second output line OL2 and the voltage level thereof thus becomes substantially the ground level. As a result, the turn-on switch 700 is turned off and the turn-off switch 800 is turned on. Consequently, as the turn-off switch 800 is turned on, the gate and source of the synchronous switch SS are interconnected through the second transistor Q2 and the fourth transistor Q4, thereby causing the synchronous switch SS to be turned off.

In this manner, provided that no secondary current I2 flows, the synchronous switch SS is turned off.

As described above, when the secondary current I2 flows, the synchronous switch SS is turned on and the secondary current I2 thus flows through the synchronous switch SS. On the contrary, when no secondary current I2 flows, the synchronous switch SS is turned off, so that it acts as a synchronous rectifier.

Meanwhile, the turn ratio between the primary and secondary current detection coils L31 and L32 of the current detector CT is preferably set to turn on the turn-off switch 800 at a predetermined time TD before the main switch MS is turned on. Therefore, on the basis of the turn ratio between the primary and secondary current detection coils L31 and L32, the current detector CT turns on the turn-off switch 800 at the predetermined time TD before the main switch MS is turned on, as shown in FIG. 9.

In this case, the secondary current I2 flows through a body diode (not shown) of the synchronous switch SS. Thus, although there is loss through the body diode, it is possible to prevent generation of reverse recovery current.

That is, it is possible to prevent reverse recovery current which may be generated due to PN junction characteristics of the MOSFET of the synchronous switch M1 when current to the MOSFET is suddenly cut off.

As apparent from the above description, the present invention provides a flyback converter with a synchronous rectifier which is applied to a power supply of a portable computer such as a notebook PC. The flyback converter is operated in a critical conduction mode to turn on/off a main switch at a zero crossing point of an output voltage. The flyback converter is also adapted to supply a driving voltage to a synchronous switch using the output voltage. Therefore, there is no need for a secondary auxiliary coil of a transformer and for a Schottky diode to be connected in parallel with the synchronous switch, resulting in simplification in circuit design.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A flyback converter with a synchronous rectifier, comprising:

a flyback switching controller for switching a main switch in a critical conduction mode on the basis of a feedback voltage to convert an input voltage into a high-frequency pulse;

a transformer having a primary coil for receiving the high-frequency pulse and a secondary coil;

a synchronous switch including a MOSFET having a source and drain connected to any one of first and second output lines connected respectively to both ends of the secondary coil;

a feedback controller for detecting an output voltage between the first output line and the second output line and outputting the detected voltage as the feedback voltage to the flyback switching controller;

a current detector having primary and secondary coils for current detection, the current detector detecting load current flowing in any one of the first and second output lines according to a turn ratio between the primary and secondary current detection coils thereof;

a current/voltage converter for converting the load current detected by the current detector into a voltage and outputting the converted voltage;

a first switch connected to the first output line through a first resistor and to the second output line for performing an on/off switching operation in response to the output voltage from the current/voltage converter;

a second switch connected to the first output line through a second resistor and to the second output line for performing an off/on switching operation in a reverse manner to the on/off switching operation of the first switch in response to the on/off switching operation of the first switch;

a constant voltage source connected to the first output line through the second resistor and to the second output line for converting a voltage on the first output line into a predetermined constant voltage and supplying the converted constant voltage;

a turn-on switch for switching a connection between the first output line and a gate of the synchronous switch in response to the constant voltage from the constant voltage source; and a turn-off switch for switching a connection between the gate and source of the synchronous switch in association with the switching operation of the second switch.

2. The flyback converter as set forth in claim 1, wherein the turn ratio between the primary and secondary current detection coils of the current detector is set to turn on the turn-off switch at a predetermined time before the main switch is turned on.

3. The flyback converter as set forth in claim 1, wherein the current/voltage converter includes:

a diode having an anode connected to a positive voltage terminal of the secondary coil of the current detector; and a resistor for voltage detection connected between a cathode of the diode and a negative voltage terminal of the secondary coil of the current detector.

4. The flyback converter as set forth in claim 3, wherein the first switch includes a first transistor of an NPN type having a collector connected to the first output line through the first resistor, an emitter connected to the second output line and a base connected to an output terminal of the current/voltage converter through a third resistor.

5. The flyback converter as set forth in claim 4, wherein the second switch includes a second transistor of the NPN type having a collector connected to the first output line through the second resistor, an emitter connected to the second output line and a base connected to the collector of the first transistor of the first switch.

6. The flyback converter as set forth in claim 5, wherein the constant voltage source includes a Zener diode having a cathode connected to the first output line through the second resistor and an anode connected to the second output line.

7. The flyback converter as set forth in claim 6, wherein the turn-on switch includes a third transistor of the NPN type having a collector connected to the first output line, an emitter connected to the gate of the synchronous switch and a base connected to the cathode of the Zener diode of the constant voltage source.

8. The flyback converter as set forth in claim 7, wherein the turn-off switch includes a fourth transistor of a PNP type having an emitter connected to the gate of the synchronous switch, a collector connected to the source of the synchronous switch and a base connected to the cathode of the Zener diode of the constant voltage source.

* * * * *